Dec. 18, 1962 L. W. GATES 3,068,781
HAY BALER
Filed May 5, 1960 6 Sheets-Sheet 1

INVENTOR.
LAUREN W. GATES
BY
Joseph Allen Brown
ATTORNEY

Dec. 18, 1962 L. W. GATES 3,068,781
HAY BALER
Filed May 5, 1960 6 Sheets-Sheet 2

INVENTOR.
LAUREN W. GATES
BY Joseph Allen Brown
ATTORNEY

Dec. 18, 1962 L. W. GATES 3,068,781
HAY BALER
Filed May 5, 1960 6 Sheets-Sheet 3

INVENTOR.
LAUREN W. GATES
BY Joseph Allen Brown
ATTORNEY

Dec. 18, 1962  L. W. GATES  3,068,781
HAY BALER

Filed May 5, 1960  6 Sheets-Sheet 6

INVENTOR.
LAUREN W. GATES
BY Joseph Allen Brown
ATTORNEY

United States Patent Office 3,068,781
Patented Dec. 18, 1962

3,068,781
HAY BALER
Lauren W. Gates, New Holland, Pa., assignor to Sperry Rand Corporation, New Holland, Pa., a corporation of Delaware
Filed May 5, 1960, Ser. No. 27,004
17 Claims. (Cl. 100—21)

My invention relates particularly to that type of wire tying mechanisms for hay balers in which terminal ends of a wire loop around a bale extended in interengaging proximity in the same direction are twisted together to form the tie externally to the bale loop. However, it will be perceived upon an understanding of my invention that it has applicability not only to bale ties of a material other than wire but also to ties per se other than twists.

It is an outstanding object of my invention to simplify such mechanism, to use the fewest number of the simplest and lightest parts which will endurably and reliably perform the functions required of them, and thereby to preserve or enhance performance, thereby reducing markedly the cost of manufacture. Such mechanisms often employ in combination a means to interengage the terminal portions of a strand loop about a bale to form the tie per se; a means for laying the terminal portions of said bale loop in interengaging proximity to the interengaging means, cyclically operated driving means; strand transfer, clamping, and cutting means located rearwardly of the interengaging means; and a unitary frame having a journal relationship to said driving means, commonly intermounting all of said elements, and adapted for anchorage to the bale case upon which the tying mechanism is mounted to prevent rotation of the frame with the cyclical driving means. I have attained and practiced the object of my invention by applying the principles involved in such simplification to each one of the devices of the mechanism in turn as will be clear from the following description.

The accompanying drawings show but the best embodiments of my invention now known to me, but it will become obvious as usual that certain features of my invention at least are readily susceptible to other embodiments.

Of the drawings.

FIGS. 15 to 21 are illustrative of a modification of the transfer, clamping and cutting device 75.

Figure 1:
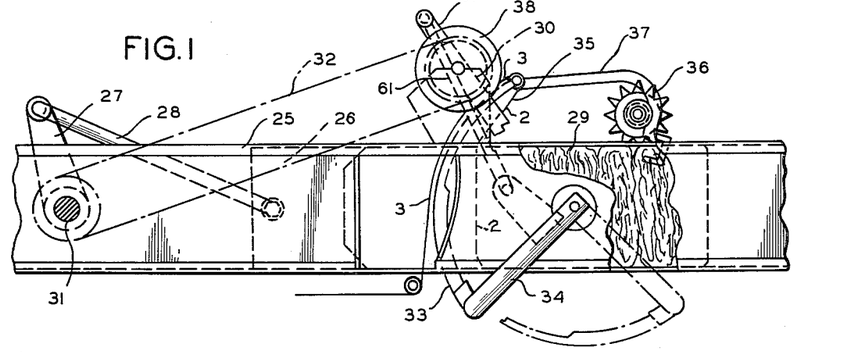
FIG. 1 is a leftside elevation in semi-diagrammatic form showing a bale case provided with a reciprocating plunger by means of which the bale is formed by compression of successive wads of hay, and the general location and manner of mounting of the tying mechanism together with the needle means for laying in the tying mechanism one of the strands to be joined together. The other is prelaid therein by the bale during the process of its formation under the action of the plunger.

In FIG. 1, 25 designates the bale case, 26 the plunger reciprocable therein, 27 the revolving crank which reciprocates the plunger through the intermediary area of the connecting rod 28. The bale in process of formation is designated 29 and the bale tying mechanism with which this application is particularly concerned is designated 30. This mechanism is driven from the same shaft 31 which drives the crank 27 through a chain and sprocket connection designated generally 32. A needle 33 carried by an oscillatable needle yoke 34, is shown in a position in which it has threaded a strand 35 through the bale case and placed it in a position to be operated upon by the bale tying mechanism 30. A bale metering device designated generally 36 is indicated to be associated through the lever 37 with the bale tying mechanism 30. As is well known such metering mechanisms control the institution of cyclical operation of the bale tying mechanism. This control is exercised through its operation of the one revolution and stop clutch 38 which receives its power and transmits it to the bale tying mechanism from the chain and sprocket connection 32.

Referring now particularly to FIGS. 2, 3, 12 and 13, the particular means shown in this embodiment to engage the terminal portions of a strand loop about a bale to form the tie per se, is a wire twisting spindle designated generally 40. As clearly appears particularly in FIGS. 2 and 3, it is inclined to the vertical plane 41 and also inclined rearwardly and downwardly, the inclination to the vertical plane being such that its lower end enters this plane. This vertical plane 41 is the plane of lay of the strands to be interengaged to form the tie.

While the body of this spindle 42 through the journaling of which the spindle is rotated to achieve the interengagement is of itself relatively small in diameter, its lower end 43 is considerably enlarged as clearly appears. This enlargement is comprised of a relatively large diametered footpiece pinned to the lower end of the shank 42 and having its lower end forged to a vertically extending flat face 45 which lies closely adjacent the plane 41 and parallel thereto. This front face 45 also is intersected by the axis 46 of the spindle. Attached to this enlarged lower end 43 is a relatively flat nosepiece 47 spaced from the flat face 45 by an intervened washer 48 of a thickness slightly greater than the diameter of the wire strands to be twisted into interengagement to form the tie and which washer places the inner flat face 49 of the nosepiece 47 near to but on the opposite side of the plane 41 from the flat face 45 and so completes the wire twisting slot 44. As clearly appears in the plan of FIG. 12, the position of the washer with respect to the axis 46 of the spindle is such that in the horizontal plane it is tangentially near to the axis 46 but to the rear by a distance substantially equal to a wire diameter. Nosepiece 47 together with washer 48 are secured firmly against the flat face 45 of the enlargement 43 by means of machine bolt 50 threaded into the part 43 and holding the parts in place through an intervened lockwasher 51. The rear end 52 of nosepiece 47 is inturned to lie flatly against the flat right angular face 53 of the enlargement 43 whereby to prevent the nosepiece from turning with the turning of the securing stud 50. The front end 54 of the nosepiece 47 is forwardly and upwardly elongated and given a lateral flare. The margins of face 45 are rounded as shown for the purpose of attaining an easy entry and flow of the wire strands to be interengaged during the twisting operation.

Figure 2:
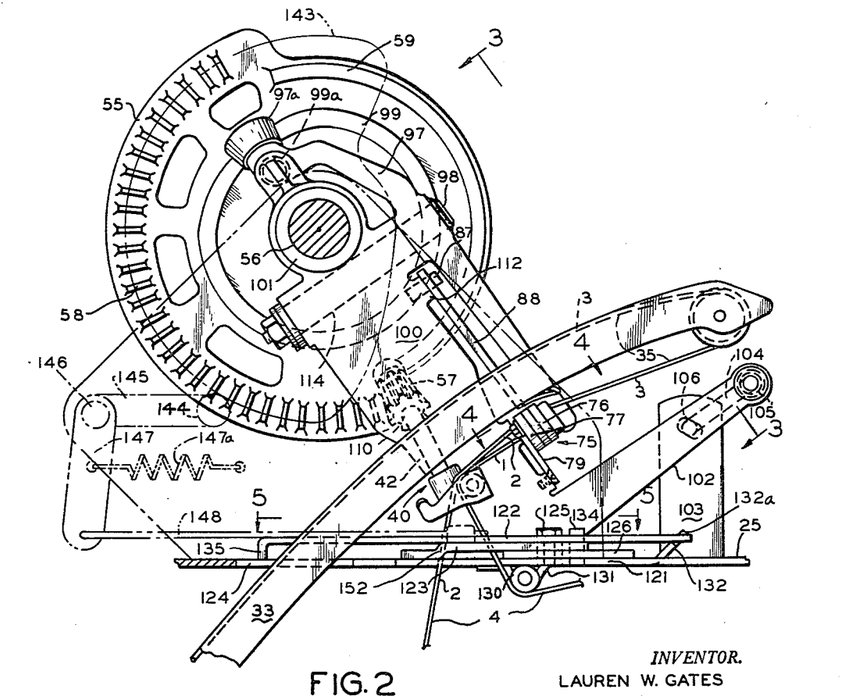
FIG. 2 is a side elevation of the tier on line 2—2 of FIG. 3, and with the parts in the relationship they have when the lays of the strands to be joined are complete and their twisting interengagement is just about to be commenced.
Figure 3:
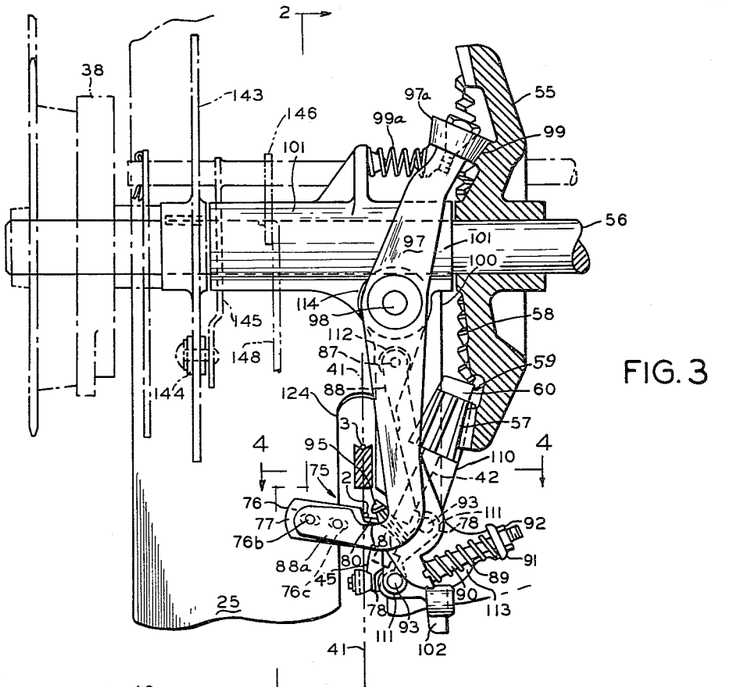
FIG. 3 is a corresponding plan view at an angle to the vertical from the direction of the arrows 3—3 of FIG. 2. In this view, wire guiding parts which lie directly below the main body of the tier are omitted for the sake of clarity. They are fully shown in FIGS. 2 and 5.

The strand laying means for one of the strands to be interengaged is the reciprocating plunger 26 which compresses the wads of hay to form the bale (see now FIGS. 1 to 3). This the plunger achieves by engaging the forward portions 3 of the needle loop 35 with the first wad of the succeeding bale after the needle 33 is retracted. Through the rearward movement of this first succeeding wad the wire 3 (commonly called at this stage the No. 3 strand) is drawn downwardly and before the advancing wad, which draft soon pulls it tautly into the twisting slot 44 (FIG. 12) of the rotatable twisting spindle 40 and against and around the spacing washer 48. Here it becomes and is commonly called the No. 1 strand of the tie to be formed of the terminal portions of the bale loop 4 which itself has taken up part of the No. 3 strand and drawn the added length needed from the wire coil being used (not shown).

The strand laying means for the other terminal portion of the bale loop (commonly known as the No. 2 strand) is constituted by needle 33 which draws yet more wire from the coil and brings a new needle loop 35 through the bale case immediately behind each completed bale and directly lays the No. 2 terminal strand of the bale loop into slot 44 immediately on top of the terminal portion No. 1 (follow FIG. 2). Inasmuch as the needle in bringing through needle loop 35 and laying No. 2 strand also brings the new No. 3 strand, the terminal portion of which the ensuing plunger action lays as the new No. 1 strand, the needle is indirectly, at least, a preliminary means for laying the No. 1 strand. At least it places that portion of the bale loop which is to constitute the new No. 1 in the vertical plane 41 of the lays and, as will be seen, places it in position to be anchored (clamped) for the consummation of the lay of strand No. 1 by the plunger action upon institution of the next succeeding bale.

The cyclical driving means for the strand interengaging means 40 is the main driving gear 55. This gear is fixed upon the tier timing shaft 56 which is driven through a one revolution and stop cycle by the clutch 38 (shown in phantom by dash and dot lines) when tripped by bale metering device 36. It drives the twisting spindle 40 through pinion 57 on shank 42 for the number of revolutions required to twist strands No. 1 and 2 together into such interengagement as affords the tie the strength desired. The main gear 55 is illustrated as provided with about 180° of teeth 58 which mesh with their pinion 57 on a four to one ratio. An intermediate land 59 locks with pinion land 60 when its four revolutions are completed (thus forming a tie of four twists) and then stops as the main gear 55 stops. Thus the pinion is locked against rotation during approximately the first 180° of each main gear cycle. During this first 180° the tier timing shaft 56 through needle crank connection 61 with needle yoke 34 drives the strand laying means comprising the needle, drives it through the bale case behind the completed bale to present needle loop 35 to the tying mechanism with the resultant direct lay of strand No. 2.

Figure 4:
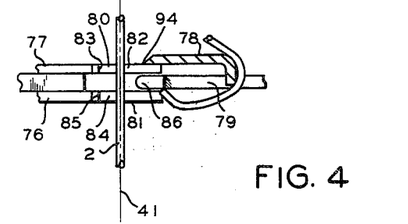
FIG. 4 is a partial top plan view of elements of the transfer, clamping and cutting means, looking in the direction of the arrows applied to the line 4—4 of FIG. 2 and FIG. 3.
Figure 6:
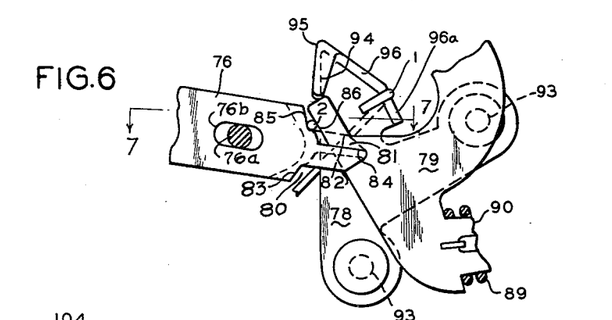
FIG. 6 is an enlarged fragmentary elevational view of the transfer clamping and cutting means substantially as seen in FIG. 3, but after the transfer means has moved to the right from its FIG. 3 position.
Figure 7:
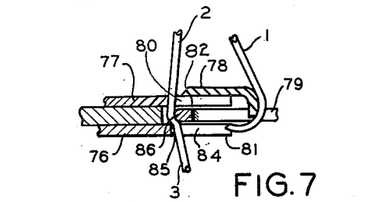
FIG. 7 is a fragmentary sectional view of the transfer clamping and cutting means taken on the line 7—7 of FIG. 6.

Details of the strand transfer, clamping and cutting means 75 are shown in FIGS. 4, 6 and 7. This means 75 functions to receive the rearward extension of the No. 2 strand as laid in the slot 44 of the twisting spindle 40, to transfer it to clamping and cutting position and there to sever the No. 2 portion from the No. 3 portion of needle loop 35 and hold the severed extremity of No. 3 clamped during its conversion into the No. 1 strand of the succeeding bale loop 4 and the extension of the loop with the succeeding bale. This means 75 is comprised of a pair of relatively flat members 76, 77 of essentially similar shape and function, and a pair of coacting interleaving relatively flat members 78, 79, which latter are of relatively very dissimilar shape and function. The two pairs are relatively laterally reciprocable toward and from each other. In this embodiment members 76 and 77 are the movable members while members 78 and 79 are the relatively fixed members, the former being assigned the strand receiving and transferring functions, and the latter respectively the coacting clamping and cutting functions. Receiving and transferring members 76 and 77 are provided with notches 80 and 81 on their upper edges intersecting the plane 41 of the lays. As laid, No. 2 strand enters the notches as appears in FIGS. 3 and 4 and is rested on the bottom or laterally extending notch edge 82 of the notch 80 of the forward member 77 and in position to be engaged by its vertically extending wall 83 and so transferred to the right when members 76 and 77 are reciprocated in that direction. The notch 81 in the rearward member 76 is of substantially the same width but is of greater depth than the notch 80 in the forward member 77 for a purpose which will presently appear. The bottom and laterally extending wall of notch 81 is designated 84 and the generally vertically extending wall 85 of notch 81 is aligned with wall 83 of notch 80 in forward member 77.

Coacting clamping member 79 is interleaved between members 76 and 77. The coacting clamping edge 86 in the region of notches 80 and 81 is downwardly and outwardly inclined to the right. The member is pivotally supported from above at 87 from a fixed support by means of a relatively long upwardly extending arm 88, while its main body is yieldingly urged toward members 76 and 77 by a compression spring 89 engaged over a lateral arm 90 of the member and bearing by an adjusting nut 92 against a fixed stop 91 on the far side of an aperture in the stop through which arm 90 is passed. Nut 92 is a movement limiting means. It is threaded onto the outer end of the arm, and fixes the rest position of the clamping member.

Coacting cutting member 78 has a somewhat triangular configuration and is fixedly secured in position flatly against the front face of the forward transfer member 77 by securing bolts 93 at its lower and outer corners. These bolts secure it to a fixed support. Its upper and inner corner projects into the region of notches 80 and 81 and is sharpened to present a downwardly and outwardly inclined (to the right) cutting edge 94. Edge 94 lies a bit to the right of clamping edge 86 as No. 2 is being laid (see FIG. 4). The upper margin 96 of member 78 is inclined laterally and downwardly away from plane 41 and flanged rearwardly. The extreme upper corner of the flange is elongated as at 95 and inclined downwardly and rearwardly toward plane 41. These features are to serve as guides for the No. 2 and No. 3 strands.

Relative reciprocation of the elements 76 and 77 on the one hand and elements 78 and 79 on the other, is effected by mounting elements 76 and 77 on the lower end of an oscillating arm 97 having a pivotal support at 98 and oscillated by a cam 99 on main gear 55, acting through follower 97a against compression spring 99a.

Figure 4A:
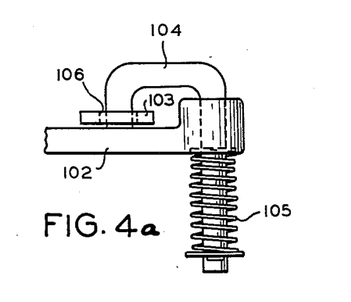
FIG. 4a is a plan view of the anchoring means for the tier frame.

The intermounting frame is the member 100. At its upper end it is provided with a frame supporting journaling 101 on timer shaft 56 and so intermounts shaft 56 and main gear 55. At its lower end it is anchored to the top of bale case 25 by a rearward extension arm 102 connected with pedestal 103 erected on the bale case by means of a U-shaped spring latch 104 (see FIGS. 2 and 4a). One branch of latch 104 is slidably projected through the extremity of arm 102 and provided upon its projecting end with a spring 105 which biases the bight of the latch toward the arm. The other arm is somewhat shorter and is projected through an elongated slot 106 in the upper end of the pedestal 103 and its projected end abutted against the side of frame arm 102. Slot 106 and the arm of the latch 104 projected through it lie on a radial line from the axis of shaft 56, with the slot elongation generally in the direction of this radial line, while the plane of the U-shaped latch and the direction of extension of arm 102 are in the neighborhood of 90° thereto. Thereby vertical breathing of the bale case which raises and lowers the pedestal has little if any effect upon the angular position of the frame 100, for the width of the U of the latch causes it to swing about its rearward arm, yet substantially no angular movement of the arm 102 can take place because the U latch resists such movement in its own plane.

The rearward extension 102 gives frame 100 a substantially L-shape in side elevation. The main body of the L mounts the strand interengaging means 40 by providing journal 110 for the spindle 42. It mounts the strand transferring, clamping and cutting device 75, providing mounting pads 111 on its rearward face for cutter 78, so establishing the plane of the cutting member 78 and receiving its securing bolts 93. It mounts the yieldingly mounted clamping member 79 by providing pad 112 for its pivot 87 and laterally extending mount 113 for the fixed stop 91. Mounting for the oscillating arm 97 which effects relative reciprocation of the elements 76 and 77 is in the form of a through journal or bearing 114 for pivotal support 98 which latter is fixedly secured to the arm 97 by welding or otherwise.

Figure 5:
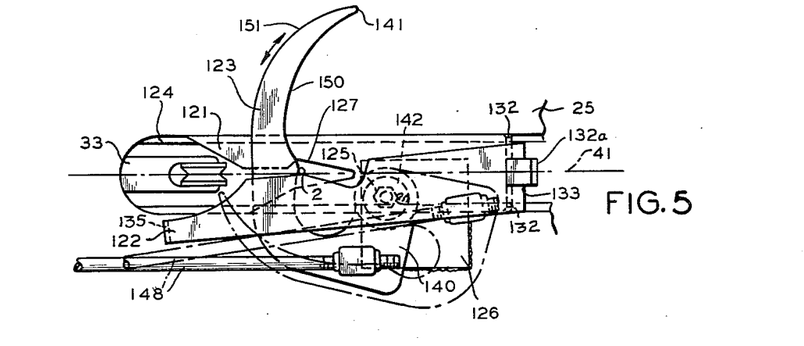
FIG. 5 is a top plan view of the wire guiding means located immediately below the main body of the tier, and which are mounted directly upon the top of the bale case, the view being taken in the direction of the arrows applied to the line 5—5 of FIG. 2.

Means (FIGS. 2 and 5) for guiding strands to and with respect to the strand interengaging means which is to join them together, is mounted upon the top of the bale case. It is comprised of a pair of fixed guide members 121 and 122 coacting with each other and a movable guide member 123, all three of which are associated with the strand interengaging means 40. The member 121 comprises an elongated flat plate extending from the region of needle emergence to a region rearwardly of the interengaging means 40. It is let into the top of the bale case slot 124 and secured in position by the bolt 125, about which member 123 pivots. This bolt commonly secures members 121 and 123 to one and the same plate members 126, the one on its under side and the other on its upper side. Member 126 is welded to the bale case 25 on the left side of the needle slot 124 and projects to the right over the slot. Member 121 is provided with a strand guiding slot 127. The specific configuration of strand guiding slot 127 may be clearly seen in FIG. 5. It should be noted that the mouth of the slot is flared outwardly (to the left and seen in FIG. 5) from the plane 41 in which the strand is laid by needle 33; and that the notch terminates (at its right end as seen in FIG. 5) in a rounded crotch, not a sharp point. On its under side guide 121 bears a guide roller 130 in bearings 131 for guiding strands from the interengaging means 40 through the crotch of notch 127 to the bale loop 4. The rear end of 121 is upturned to provide shoulders 132 and provided with a tab 132a.

The rear end of guide 122 is provided with a complemental notch 133 which receives tab 132a in such manner as to fix the rear end against lateral movement and to seat it upon the shoulders 132 of the upturned end of member 121. The front end of 122 is provided with a downturned tab 135 which rests upon the top of the bale case 25 just left of (below on FIG. 5) the bale case slot 124. A roll pin 134 positions guide 122 on support 126 and guide 121. The body of guide member 122 is not slotted but its entire right side is cut away in a manner to complement the slot 127 in member 121 in guiding the No. 2 strand to and into engagement with interengaging means 40. To this end from tab 135 rearwardly the righthand side of guide plate 122 is inclined rearwardly toward the longer (righthand) flaring point of member 121, then midway of the parallel portion of this larger point it extends rearwardly a distance substantially parallel to lay plane 41, but in or slightly to the left of this plane (below in FIG. 5) and spaced from the corresponding portion of member 121 by a distance but slightly greater than the diameter of a strand to be laid. Rearwardly of this parallel portion the edge of 122 is sharply concave outwardly, and in its rearward extent it intersects plane 41. Thus guides 121 and 122 insure that No. 2 strand will be entered in twisting slot 44 of means 40. Plate 122 is held in place by the same bolt 125 which holds members 121 and 123 and by roll pin 134.

Movable guiding member 123 is in the form of a hook-shaped strand engaging finger wide at its base end 140 but tapering to a point 141 at its extremity. It is pivoted around a ferrule 142 about the body of securing pivot bolt 125, and oscillated in timed relationship to the other devices of the tier mechanism by means of a cam 143 (see FIGS. 2 and 3) carried by the timing shaft 56 and operating on follower 144 of arm 145 to oscillate a rock shaft 146 connected to the guide finger 123 by means of arm 147 on shaft 146 and link 148. This finger 123 engages the strand to be guided by its inner edge 150, which edge is at decreasing distances from its point to pivot 125, while the outer reach of its outer edge 151 lies substantially upon a true circle about the pivot 125. The body of member 123 is deflected at 152 downwardly (see FIG. 2) to place its engaging portion in a plane between members 121 and 122 and close to the top of the bale case 25 and the top of member 121.

Figure 14:
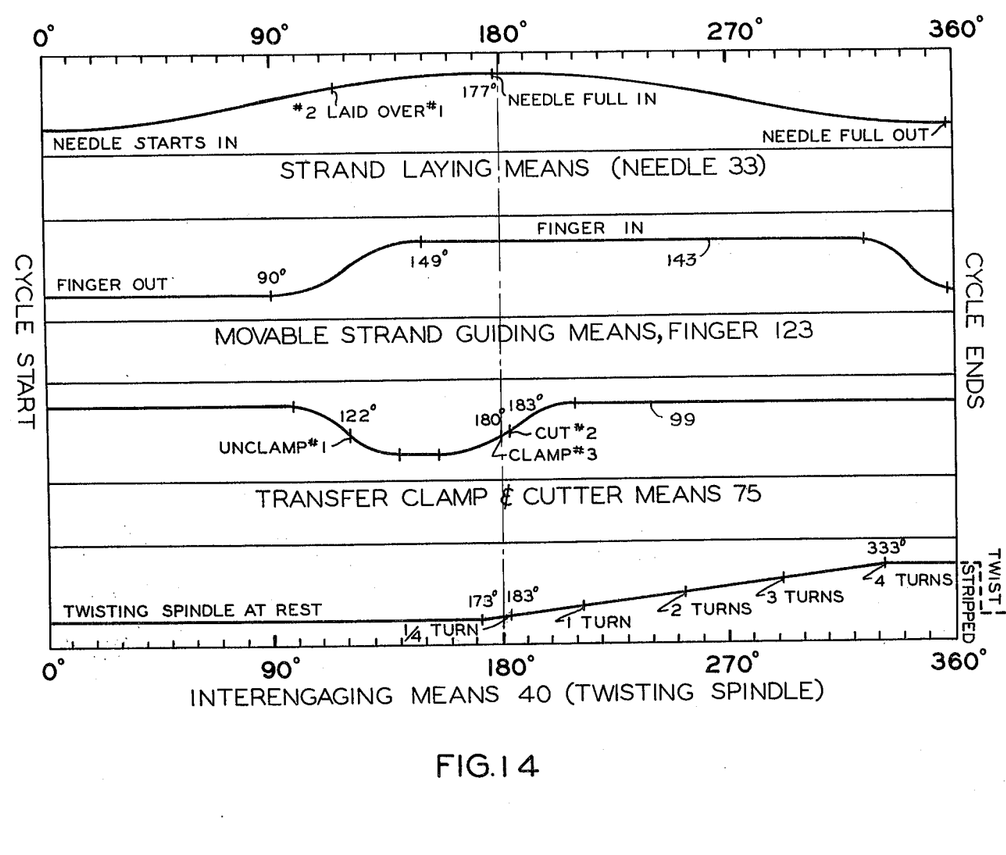
FIG. 14 is a composite linear diagram of the cyclical timing relationship of the various devices of which the tying mechanism is comprised.
Figure 15:
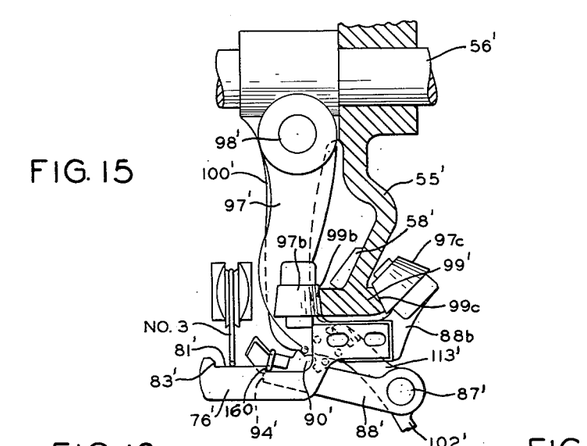
FIG. 15 being a rear view corresponding to FIG. 3 of the embodiment of the subject of FIGS. 1–14 and FIGS 16 to 19 inclusive being a series of views similar to FIGS. 6, 8 and 10 of the embodiment of the subject of FIGS. 1–14.

To follow the operation of the tier mechanism through a tying cycle particular reference should be made to the timing diagrams of FIG. 14 and the cycle then traced through by following the supplement to the constructional drawings which is provided by the operational drawings of FIGS. 4 and 6 to 11. The rectilinear timing diagrams of composite FIG. 14 are each drawn to the same length, a length representing the length of time of a single tying cycle, and the 360° revolution of drive shaft 56 and main gear 55, for the mechanism accomplishes the strand interengaging operation in the one single revolution of the timer shaft 56. FIG. 14 depicts the relative timing during the cycle of each of four of the several means which cooperate to effect the tie, as indicated by the four principal legends applied. They are from top to bottom the strand laying means comprised of needle 33, the movable strand guiding means comprised of the hook shaped finger 123 of FIGS. 2 and 5, the transfer, clamp and cutting means 75, and the strand interengaging means 40 comprised of twisting spindle 42 and attendant parts. The length of the composite chart is linearly extended 360° which are indicated at the top and the bottom by graduations in increments of 10°. The relationship of each of the several means to the 360° of the cycle is depicted in each case by a curve lined in heavily above a determinate base line, and the height of this curve above the base line represents the extent of movement of the means to which it applies for each degree of the cycle. In the case of the needle there are represented the various positions of the needle in its total stroke, and in the case of guiding finger 123 the representation is the same, while in the cases of the clamping and cutting means and the twisting spindle it is in the one case actuating cam rotation in degrees and in the other the number of twisting spindle turns. In the instances of the finger 123 and the clamp and cutter means 75 which are respectively cam operated, the curves depicted simulate the respective shapes of the cams.

Beginning the cycle the needle 33 starts and continues from 0 degrees on its in-stroke while all three of the other means are stationary and remain stationary, the finger and the clamping and cutting means for approximately the first 90° of needle movement, and the twisting spindle for 173° of that movement. The No. 1 strand is already in the twisting slot 44 at the start of the cycle, (having been laid there incident to the formation of the bale) but at about 113° the No. 2 strand of the needle loop also becomes laid in slot 44. Some 13° before this, about the 90° point, finger 123 moves its point in behind the No. 2 strand as it emerges from bale case slot 124 and as the needle 33 moves its upper portion toward twisting slot 44, the finger engages the lower reach of No. 2 by inner edge 150 and moves it progressively nearer to nosepiece 47. This action can be understood from FIG. 5, and from FIG. 2 it will be seen that this action substantially equalizes the angles in a vertical plane Nos. 1 and 2 make with the axis of the twisting spindle. At about 100° the transfer members 76, 77 (see FIGS. 3 and 4) are set in reverse motion (to the left) by spring 99a and a negative action of cam 99 acting upon their supporting lever 97 to unclamp (at 122°) the terminal end of the No. 1 strand. By this time the new No. 2 is laid in notches 80 and 81 of members 76, 77, for needle 33 is well on its way toward the top of its stroke (indicated as reached at 177°). Yet the twisting spindle 40 has not yet commenced its rotation. This does not commence until the 173° point in the cycle is reached. As the twisting spindle starts the situation is depicted by the showings in full lines in FIGS. 2, 3 and 5, where the needle 33 is shown quite near the upper end of its stroke, and strands Nos. 1 and 2 constituting the ends of loop 4 about the bale both lie in twisting slot 44 of interengaging means 40, the theretofore clamped end of No. 1 has been released (FIG. 4), and No. 2 lies in notches 80, 81 ready to be transferred to clamping and cutting positions. The release of No. 1 at 122° takes place as reverse movement (to the left) of transfer members 76, 77 is well along.

Figures 8, 9, 10, 11:
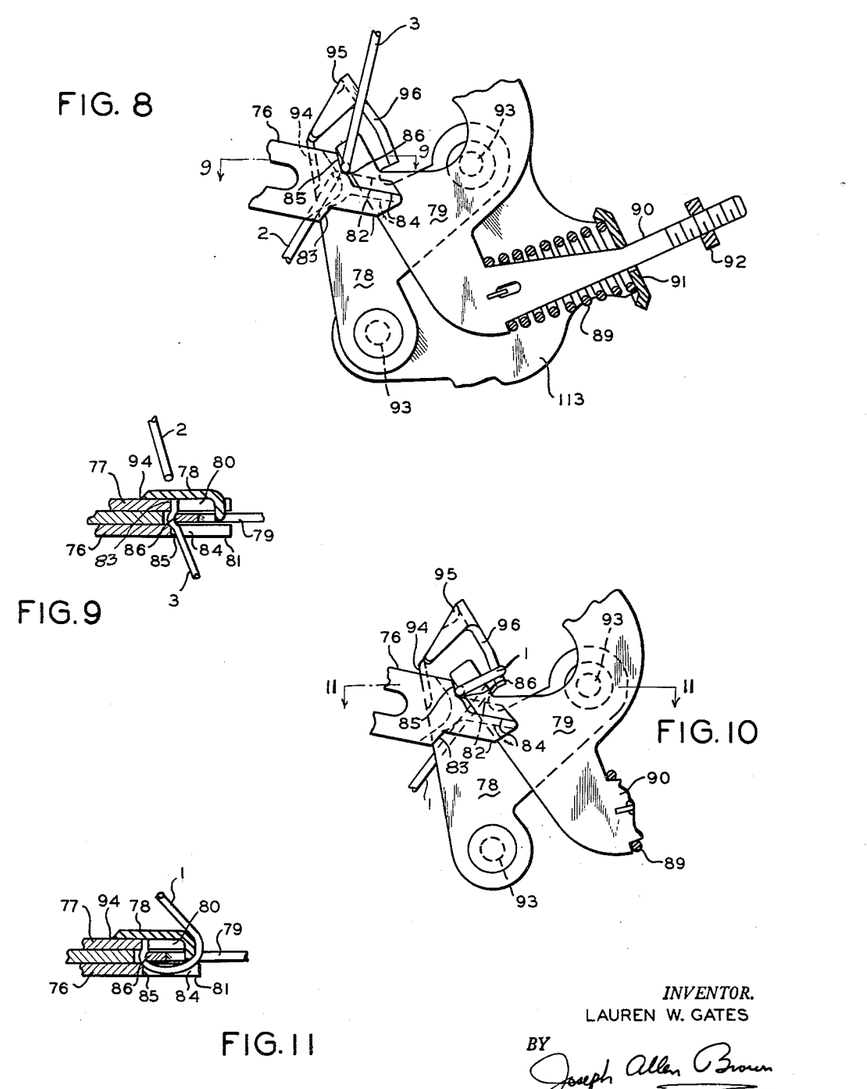
FIG. 8 is a view similar to FIG. 6 showing the relative positions of the transfer clamping and cutting means at a point further along in their time cycle of operation.
FIG. 9 is a fragmentary sectional view of the transfer clamping and cutting means taken on the line 9—9 of FIG. 8.
FIG. 10 is a view similiar to FIGS. 6 and 8 showing the transfer clamping and cutting means still further along in their time cycle of operation.
FIG. 11 is a sectional view of the transfer clamping and cutting means taken on the line 11—11 of FIG. 10.
Figures 12, 13:
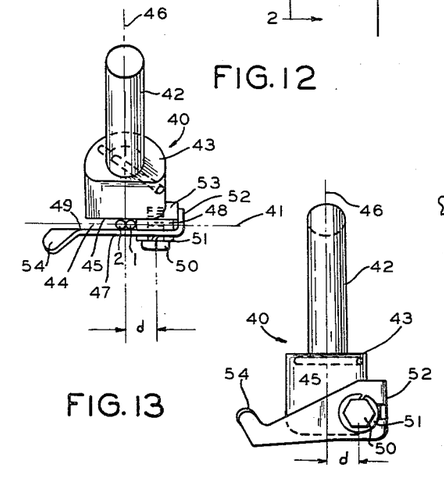
FIGS. 12 and 13 are respectively top plan view and side elevational view of the strand interengaging means; which as shown is in the form of a spindle, having strand interengaging formations upon its lower end.

About the 155° point obverse movement (to the right) sets in under the positive action of cam 99. This obverse moment as shown in FIGS. 6 and 7, engages No. 2 strand with walls 83, 85 of the notches 80, 81 and transfers it first to the clamping member 79 (at the 180° point in the cycle) where it becomes firmly held by edge 86 under pressure from spring 89. Almost immediately afterward (at 183°) it is transferred further to the cutting member 78, and the No. 2 strand severed from the No. 3 by cutting edge 94 as shown in FIGS. 8 and 9.

In the meantime at about the 173° point teeth of main gear 55 engage pinion 57 and the twisting spindle 40 commences its rotation (10° before the cut at 183°), with the result that strands Nos. 1 and 2 are twisted about ¼ turn before the cut of No. 2 takes place. This pretwist aids in retaining them in twisting slot 44 even though loosed from means 75. Completion of the four turns of the twisting spindle required to twist the ends together four times follows rapidly.

The guide finger 123 remains all the way in until the tie is nearly completed (near the 325° point) when cam 143 releases the finger to the control of retracting spring 147a and it springs back to the rest position shown in dotted lines in FIG. 5. Shortly after the cut at 183°, about the 195° point the obverse movement of transfer member 76, 77 ceases, cam follower 97a once more riding upon the extended raised portion of cam 99. The No. 1 end is thus clamped against member 79 and the maximum pressure of spring 89, and so transfer, clamping and cutting mechanism 75 rests, until the next succeeding bale is completed. This is the situation depicted in FIGS. 10 and 11. In these figures it will be noted that the No. 3 of FIGS. 8 and 9 is shown as pulled down over the outwardly and downwardly extending rearward flange 96. The new bale does this as it draws No. 1 into the twisting groove 44 and renders it taut as the bale grows, its end being firmly retained between members 76, 77 and 79. The tine 95 and the downward incline of flange 96 guide the No. 3 strand smoothly to its No. 1 position. Due to the fact that when tine 95 displaces the plane of loop strand 3 toward the plane of its clamped end, its free reach when fore-shortened as the new bale is formed is drawn over the downwardly inclined flange 96 and due to the incline drawn yet further away from the plane of the lay of the new strand in the strand receiving notches 81 and 82. This avoids all interference between the old and the new strands.

The mechanism so constructed and operated realizes all the advantages heretofore set forth to wit: simplicity, lightness in weight, durability, efficiency, and low cost. Other advantages may be realized. There may be mentioned the pivotal support at 98 for the arm 97 which carries the transfer members 76 and 77. This is a firm support affording close alignment of parts, yet it is relatively free of friction. The arc of movement of members 76 and 77 with respect to the angle of cutting edge 94 affords a most efficient cutting angle, thus reducing the force required for cutting and so reducing strains upon the parts involved. Clamping action between members 76, 77 and clamping member 79 involves a minimum of rubbing action and so the wearing life of the parts is prolonged and possible damage to the wire strand is avoided.

Parts 76 and 77 as can be seen from FIGS. 3 and 4 and 6 to 11 are identical in shape and mounting. In shape each is provided with both a flat-bottomed notch 80 and a stepped-bottomed notch 81, the one being on the opposite edge from the other. The attitude of the front member 77 is reversed 180° from that of member 76, thus, rendering its shallower flat bottomed notch 80 upwardly presenting, while the obverse attitude of rear member 76 presents upwardly its deeper stepped bottom notch 81. Should the upwardly presenting notches become worn or damaged, merely by turning the members 76, 77 over and exchanging their relative positions the extra notches 80 and 81 become usable in place of the worn or damaged notches. The symmetry of mounting admits of this. The mounting is by bolts or screws 76a passed through holes 76b in the members which are elongated in the direction of reciprocation thereby affording ready means of adjustment for timing purposes and to compensate for wear.

The fact that the notch 81 of rear member 76 is deeper than the notch 80 of the front member results not only in earlier freeing of the clamped wire end at the start of the obverse movement, but also in giving the freed end a chance to withdraw from the clamping reach of clamping member 79 under the tension to which the No. 1 strand is subject due to bale formation. The more abrupt inclination of the lower part 96a of guiding flange 96 aids in this release by affording a better angle for the wire end movement.

The overall simplicity, directness, and straightforward design of the individual parts including that of the one branch frame 100 contributes not only to generally smaller overall dimensions and greater freedom and adaptability of application to balers of widely different size where different numbers of units are required, but also renders the mechanisms and their operation more open for inspection, lubrication, and maintenance.

Figure 20:
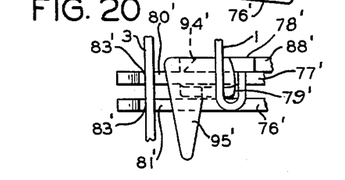
FIG. 20 is a fragmentary plan view of the modified embodiment of the transfer clamping and cutting means as shown in FIG. 16.
Figure 21:
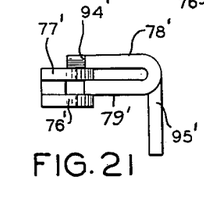
FIG. 21 is an elevational view of the structure shown in FIG. 20 when looking from right to left at the structure of FIG. 20.

My invention is susceptible of modification without departing from its generic spirit. In FIGS. 15 to 21 I show semi-diagrammatically one such modification of the transfer, clamping and cutting device 75. The parts are modified to do the clamping of No. 1 between horizontally extending rather than vertically extending edges or surfaces, to provide a more positive release of the No. 1 clamped end, to simplify the cutting and clamping members and their support, and to provide positive relative movement of the elements in both obverse and reverse movement. Parts having the same general function have been in general given the same numbers as those in the first described embodiment. Thus 76' denotes a transfer member provided with a notch 81' which receives the No. 3 strand on its bottom (FIG. 15) and when moved to the right (FIGS. 16 and 17) transfers the strand to engagement by clamping member 79' and in such transfer brings about its cutting against cutting edge 94' (FIG 17) to sever the No. 2 strand from it. The showing being semi-diagrammatic, it is to be understood that as in the first embodiment there is to be provided a duplicate of member 76' disposed on the forward side (relative to the baler as a whole) of member 79' (as in the instance of member 77' shown in FIGS. 20 and 21) and that the cutting edge 94' is to be borne by a cutting member (as 78') on the forward side of member 77'. In other words the four elements 76', 77' and 78', 79' are to be interleaved just as in the first embodiment. As best seen in FIGS. 20 and 21, the clamping member 79' and the cutting member 78' may be conveniently provided as integrally formed portions of the support member 88'.

Figure 17:
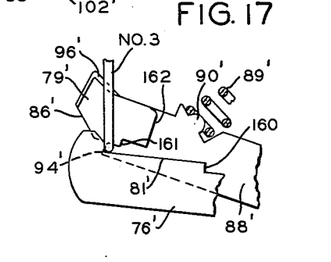
Figure 18:
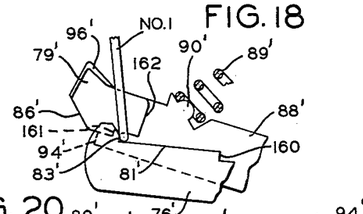
Figure 19:
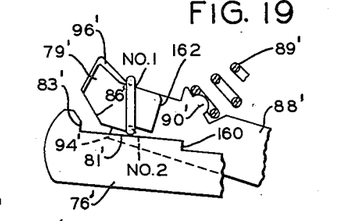

The real modifications reside in these features. Firstly, as can be seen in FIG. 17, instead of clamping in a generally vertically extending plane by pressing the strand against the vertically inclined edge 86', transfer notch 81' uses inclined edge 86' merely as a means of approach to and operation of a generally horizontally extending stepped clamping edge 161 on the underside of the member 79'. Due to the incline of edge 86', pressing the strand against it lifts member 79' against the pressure of its reacting spring 89' and so places the strand directly under the stepped horizontally extending edge 161. Further obverse movement of member 76' first engages the strand with cutting edge 94' to sever the No. 2 strand (as shown in FIG. 17) and continuing movement carries the strand beyond the upward step in edge 161 and to the rest position of clamping of the severed end shown in FIG. 18. As the No. 3 strand becomes the bale loop of the succeeding bale its severed end so clamped becomes the No. 1 strand of the succeeding tie.

Figure 16:
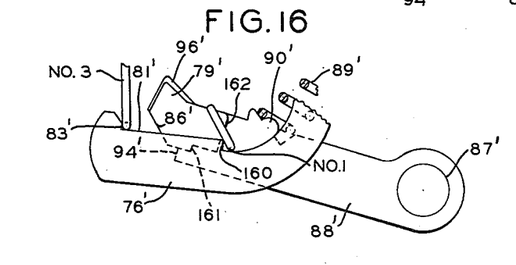

Secondly, the horizontally extending bottom of notch 81' is also stepped as at 160, and this step is a downward rather than an upward step as in the case of the step in edge 161 of member 79'. Step 160 is so located that when the member 76' is at its extreme of obverse movement to receive the No. 2 strand (FIG. 15) step 160 engages behind the clamped No. 1 strand, clamp spring 89' pressing down dropping the end of No. 1 strand behind the step as it passes. Thereby when the reverse movement first sets in as depicted in FIG. 16 the No. 1 end until now clamped between stepped edge 161 and the stepped bottom of notch 81' is pushed by step 160 beyond the end 162 of clamping surface 161 and positively freed from its clamping engagement. Indeed as can be discerned from FIGS. 17 and 18 this positive freeing of the No. 1 end may even carry it free of the end edge 162 of member 79' for step 160 comes to rest a considerable distance beyond it.

Thirdly, the greater simplification resides in the horizontal arrangement of the support 88' of member 79' as against the vertical arrangement of the first embodiment. Its pivot 87' is on the right, its length is foreshortened and straightened and its engagement by spring 89' is simplified. Member 79' therefore may be foreshortened as illustrated and cutting edge 94' may if desired be either formed upon the support 88'. An integral one piece formation of elements 88', 94' and 79' is shown in plan and elevation in FIGS. 20 and 21. Here clamping member 79' is formed by turning over a wing on the upper edge of 88', while cutting edge 94' is formed by sharpening the fore end of 88'. Tine 95' may also be formed of the same piece or may be welded thereon.

Fourthly, the support and actuating member 97' of transfer member 76' (and its mate 77') is foreshortened by omitting the upper end used in FIG. 3, turning its lower end outwardly and under main gear 55'. Transfer members like 76' are mounted upon the out-turned portion 88b. Also mounted upon it are two cam followers 97b and 97c which bear respectively upon the outer and inner faces 99b and 99c of a peripheral cam 99' carried by main gear 55'. Thus spring 99a of the first embodiment is dispensed with and the transfer and cutting movements of the device are rendered entirely positive.

Extension 113' of frame 100', of course, is lowered to pass under the peripheral cam 99' and there provide seating for spring 89'.

Yet other embodiments are possible, also without departing from the generic spirit. The annexed claims should cover all of them.

Having thus described my invention, what I claim is:

1. A bale tying mechanism for hay balers comprising in combination a means to interengage the terminal portions of a strand loop about a bale to form the tie per se, means operable in a given plane for laying the terminal portions of said strand loop into engaging proximity to the interengaging means, cyclically operated driving means for the interengaging means, reciprocable strand transfer means embodying a member mounted for reciprocation in a plane substantially perpendicular to said given plane, said member extending generally transverse to said given plane and having an edge forming the side and bottom of a notch provided therein and opening toward said strand laying means, relatively fixed clamping means disposed to one side of said given plane and lying in the plane of reciprocation of said member, the bottom of said notch normally lying in said given plane in such position that when said strand laying means is operated it lays the strand directly into engagement with the bottom of said notch, means engaging said driving means for reciprocating said member after the strand has been received in said notch to move said strand out of said given plane and into clamping engagement between the side and bottom of said notch and said clamping means, said clamping means embodying a relatively fixed clamping member engageable with said strand to force the strand into the juncture of the side and bottom of said notch, relatively fixed cutting means coacting with said transfer means upon reciprocation of said member to sever said laid strand into two separated portions at a point between the clamping means and the interengaging means, whereby the portion laid in proximity to the interengaging means is freed to be operated upon by said interengaging means and the remaining portion is clamped between the side and bottom of said notch and said clamping means during the formation of the next succeeding strand loop.

2. A bale tying mechanism according to claim 1 in which said cyclically operated driving means includes a main gear, and a unitary frame member intermounts all of said elements save the said laying means, said frame member comprising a single elongated arm having journal relationship to said cyclical driving means and projecting radially therefrom, the plane of reciprocation of said strand transfer member being generally parallel to said radially projecting arm.

3. A bale tying mechanism according to claim 2 in which said reciprocable member is a portion of an oscillatable lever member pivotally mounted on said single armed frame and oscillated from said main gear.

4. A bale tying mechanism according to claim 1 in which said reciprocable transfer means comprises a portion of an oscillatable lever member one end of which engages said driving means.

5. A bale tying mechanism for hay balers according to claim 4 in which the means for operating the oscillatable lever comprises a dual externally oppositely faced cam and dual followers carried by the lever and engaging respectively opposite faces of the cam upon opposite reciprocations of said transfer means.

6. A bale tying mechanism according to claim 1 in which guiding means for the clamped portion of the severed strand emanates from said fixed cutting means and has an inclined surface to guide the clamped strand toward a vertical plane to which the clamped portion has been transferred by the transfer means and there to retain it during the formation of the next succeeding bale.

7. A bale tying mechanism according to claim 1 in which said clamping means comprises a yieldingly mounted member having a fixed initial engaging position, and the coacting transfer means is cyclically reciprocable.

8. A bale tying mechanism according to claim 1 in which said transfer means comprises a relatively flat member bearing the strand receiving and transferring notch in an edge thereof, and said clamping and cutting means comprise a pair of spaced relatively flat members parallel to said transfer member and coactively interleaved edgewise with said transfer means, said cutting and clamping members being in sliding engagement with said transfer member and having edge portions at an angle to the direction of reciprocation of said transfer member and coacting with the edges of said notch.

9. A bale tying mechanism according to claim 8 in which the notch has an upwardly extending edge and the cutting and clamping members are provided with inclined upwardly extending edges which respectively in their cutting and clamping coact with the upwardly extending portion of the notch of the transfer means to engage the strand.

10. A bale tying mechanism according to claim 8 in which the upwardly extending edges of the notch of the transfer means and the clamping means are inclined toward each other in their upward extent.

11. A bale tying mechanism according to claim 1 in which the transfer means comprises a pair of spaced relatively flat front and rear members provided with generally registering strand receiving and transferring notches, the notch in the rear member being deeper than the notch of the front member, whereby the portion clamped when released under tension from the notch of the front member is drawn down into the deeper notch of the rear member.

12. A bale tying mechanism according to claim 1 in which the transfer means comprises a pair of spaced relatively flat front and rear members provided with generally registering strand receiving and transferring notches, the notch in the rear member being deeper than the notch in the front member, and the clamping means embodying a downwardly inclined clamping edge at an angle to the transferring edge of the notch together with an inclined top edge over which the clamped strand is drawn taut, whereby when the clamped portion of the strand is released under bale tension its freed end is drawn downwardly and outwardly into the free space provided by the deeper notch and thereby prevented from being fouled by a strand newly received into the front notch.

13. A bale tying mechanism according to claim 12 in which the front and rear members are provided on opposite edges with notches of different depth but the same in each member, and thereby rendered identical duplicates susceptible to having their front and rear positions reversed by turning each of them over 180° front to rear.

14. In a bale tying mechanism tie strand interengaging means comprising an inclined strand twisting spindle bearing a planar face at an angle to its axis and a flat surface at an angle to said face, a sheet metal nose-piece secured to said face but spaced at least one strand diameter therefrom and forming therewith a strand engaging and twisting slot, said nose piece having an aligning portion turned at an angle to its main body and bearing flatly against said flat surface of said spindle.

15. A bale tying mechanism for a hay baler having a bale case in which hay bales are formed and upon which the tying mechanism is disposed, said tying mechanism comprising in combination means to interengage the terminal portions of a strand loop about a bale to form a tie per se, strand clamping and severing means coacting therewith, a drive shaft from which said means are actuated, a common frame mounting said means and journaled on said drive shaft for angular adjustment thereabout, and a lost motion frame anchoring means adapted to freely adjust the angle of said frame with respect to the bale case upon which said tying mechanism is disposed.

16. A bale tying mechanism according to claim 15 in which the lost motion frame anchoring means comprises a fixed anchor part connected with the bale case, and an associated anchor part of said frame, connected together by an anchor bolt carried oscillably from a distant center by the frame part and a bolt socket elongated on the arc of oscillation of the bolt carried by the bale case part, the plane of the bolt and its center of oscillation lying at an angle which approaches a right angle to the plane including the drive shaft and the anchor portion of the frame.

17. A bale tying mechanism according to claim 1 in which the transfer means comprises a pair of relatively flat front and rear members of identical shape whereby they are interchangeable, and each is provided a strand receiving notch on each of its opposite edges, the notch on the one edge being deeper than the notch on the other, and said members are interchangeably mounted for strand transfer with the front member presenting its shallow notch and the rear member presenting its deeper notch in strand receiving position, and the clamping and cutting means are also relatively flat members interleaved with said pair of transfer members.

References Cited in the file of this patent

UNITED STATES PATENTS 2,946,356    Young _______________ July 26, 1960

FOREIGN PATENTS 314,460    Germany _____________ Sept. 19, 1919